(12) United States Patent
Koike et al.

(10) Patent No.: US 7,512,979 B1
(45) Date of Patent: Mar. 31, 2009

(54) LOG FILE PROTECTION SYSTEM

(76) Inventors: Hideki Koike, 5-29-17-1104 Ogikubo, Suginami-ku, Tokyo 167-0051 (JP); Tetsuji Takada, 2-46-12#205, Tobitakyu, Chofu-shi, Tokyo 182-0036 (JP)

( * ) Notice: Subject to any disclaimer, the term of this patent is extended or adjusted under 35 U.S.C. 154(b) by 1747 days.

(21) Appl. No.: 09/710,203

(22) Filed: Nov. 9, 2000

Related U.S. Application Data (60) Provisional application No. 60/167,829, filed on Nov. 29, 1999.

(30) Foreign Application Priority Data

Nov. 12, 1999 (JP) .............................. H11-322630

(51) Int. Cl.
*G06F 12/16* (2006.01)
*G06F 12/00* (2006.01)
(52) U.S. Cl. ............................. 726/23; 726/22; 707/202
(58) Field of Classification Search ................ 713/200, 713/201; 707/202; 726/23, 22
See application file for complete search history.

(56) References Cited

U.S. PATENT DOCUMENTS

| | | | | | |
|---|---|---|---|---|---|
| 5,287,504 | A | * | 2/1994 | Carpenter et al. | 707/201 |
| 5,455,947 | A | * | 10/1995 | Suzuki et al. | 707/204 |
| 5,544,359 | A | * | 8/1996 | Tada et al. | 707/202 |
| 5,713,008 | A | * | 1/1998 | Falkner | 711/118 |
| 5,847,972 | A | * | 12/1998 | Eick et al. | 709/246 |
| 5,951,695 | A | * | 9/1999 | Kolovson | 714/16 |
| 5,978,475 | A | * | 11/1999 | Schneier et al. | 713/177 |
| 6,073,128 | A | * | 6/2000 | Pongracz et al. | 707/3 |
| 6,178,427 | B1 | * | 1/2001 | Parker | 707/202 |
| 6,289,357 | B1 | * | 9/2001 | Parker | 707/202 |
| 6,611,850 | B1 | * | 8/2003 | Shen | 707/204 |
| 6,948,038 | B2 | * | 9/2005 | Berkowitz et al. | 711/162 |
| 7,185,366 | B2 | * | 2/2007 | Mukai et al. | 726/23 |
| 2002/0107877 | A1 | * | 8/2002 | Whiting et al. | 707/204 |

OTHER PUBLICATIONS

Schneier, Bruce and Kelsley, John, "Cryptographic Support for Secure Logs on Untrusted Machines", Jan. 1998, Seventh USENIX Security Symposium Proceedings, USENIX Press, pp. 53-62.*
Schneier, Bruce and Kelsey, John, "Secure Audit Logs to Support Computer Forensics", May 1999, ACM Transactions on Information and System Security, vol. 2, pp. 159-176.*

* cited by examiner

*Primary Examiner*—Kaveh Abrishamkar
(74) *Attorney, Agent, or Firm*—Christensen O'Connor Johnson Kindness PLLC (57) ABSTRACT

The present invention provides a log file protection system which makes it difficult for computer log information to be altered or deleted. A log information reception process includes receiving log information output from an original application process 210, and storing it in an internal cache 232 in a NIGELOG processing module 230. A hiding directory information gathering process scans a file system 300 to collect information on directories in which hiding is possible. This information constitutes a list of directories 233 in which hiding is possible, and is stored as a variable in the NIGELOG processing module 230. This variable is used by the NIGELOG process whenever files are generated or moved. An alteration detection and log information writing process detects alterations in log files, automatically restores these when alteration is detected, and periodically re-hides log files.

24 Claims, 5 Drawing Sheets

LOG FILE PROTECTION SYSTEM

RELATED APPLICATIONS

This application claims the benefit of priority of Japanese Patent Application H11-322630, filed Nov. 12, 1999, and Provisional Application No. 60/167,829, filed Nov. 29, 1999, the benefit of which is hereby claimed under 35 U.S.C. § 119.

BACKGROUND OF THE INVENTION

1. Field of the Invention

The present invention relates generally to computer system operations, and more specifically to a log file protection system which prevents intruders from deleting or altering server computer log information.

2. Relevant Art

Intruder detection comprises the two principal elements of log information collection and log information analysis. In other words, intruders cannot be detected without log information. From the point of view of an intruder evading detection, it is indispensable for them to delete any data evidence of the intrusion recorded in the log information; and tools exist for doing this. In some countries unprecedented debate has been held concerning legislation that would make the maintenance of log information concerning intrusions mandatory. It is clear that such log information is indispensable for the detection of intruders, and therefore there is a need to protect such log information from deletion or alteration by intruders.

Log file protection systems for these purposes exist (for example, see Bruce Schneier, John Kelsey: Cryptographic Support for Secure Logs on Untrusted Machines, The Seventh USENIX Security Symposium Proceedings, USENIX Press pp. 53-62, 1998, Core SDI S. A.: secure syslog, http://www.core-sdi.com/Core-SDI/english/slogging/ssyslog.html). These systems concentrate primarily on making it difficult to alter log information. This in itself is a very important function. However, once log information has been altered or deleted, some of this log information is lost, and it is not possible to restore it. Normal files can be restored from backups or from the original media, but as log information is updated from time to time, even if a backup exists for a certain point in time, it is possible that new log information will have been added thereafter. It is clear, therefore, that simple backups alone are insufficient.

The following two methods are well known as countermeasures for log information alteration or deletion:
storing log information on write-once media; and
transferring log information to a computer considered to be secure, via a network.

There are, however, problems with these methods. The information must be stored on the write-once media at some particular point and, if that point in time is not opportune, there is a risk of losing data. For example, it is clear that periodic backups using a UNIX based cron daemon to start specific programs at a specified time and day of the week leave the possibility of data loss.

Furthermore, methods that involve the transfer of log information via a network to a computer assumed to be secure entail various problems in terms of the transfer itself.

SUMMARY OF THE INVENTION

As mentioned above, it is indispensable that logs of computer system operations be protected. An object of the present invention is, therefore, to protect log information by making it difficult to alter or delete the log information of a server computer.

In order to achieve this object, the present invention provides a system for protecting log files in which computer system operations are recorded, comprising: log file creation means which create a plurality of identical log files which record the computer system operations; alteration detection means which periodically monitor the log files for alteration or deletion; and restoration means which restore the altered or deleted log file, from another log file, when the alteration detection means detect that a log file has been altered or deleted.

Accordingly, even if a log file is altered or deleted, the integrity of the log file is protected because the log file information can be restored from a plurality of identical log files.

The log file creation means may be such that, using identical data, a plurality of log files are created in parallel. Accordingly, it is possible to create a plurality of log files in real time.

Hiding means may also be provided which hide all but one of the log files. These hiding means periodically re-hide the hidden log files to different locations, which makes it difficult for an intruder to know where the log files are located, should the intruder attempt to alter or delete the log files so as not to leave traces of the intrusion. These hiding means also re-hide hidden log files to different locations when the alteration detection means verify that alteration or deletion has taken place, thereby protecting these log files from further deletion or alteration.

When the alteration detection means detect an altered or deleted log file, as means are provided which perform additional processing, additional processing can be performed automatically, when alteration or deletion of any of the log files is detected. This additional processing may include, for example, notifying a system administrator of the detected alteration, or printing out all of the current log information on paper.

Recording media which stores a program capable of implementing the log protection system described above on a computer system is within the scope of this invention.

BRIEF DESCRIPTION OF THE DRAWINGS

The invention will be more particularly described with reference to the accompanying drawings, wherein.

DETAILED DESCRIPTION OF THE PREFERRED EMBODIMENTS

In the present invention, while log information is output to an original log file, the same log information is also output to backup log files, so as to produce backup log files having identical content. The invention also provides a function that detects alteration or deletion of log files. Further, the invention provides a function that automatically restores log information when such events are detected.

Figure 1:
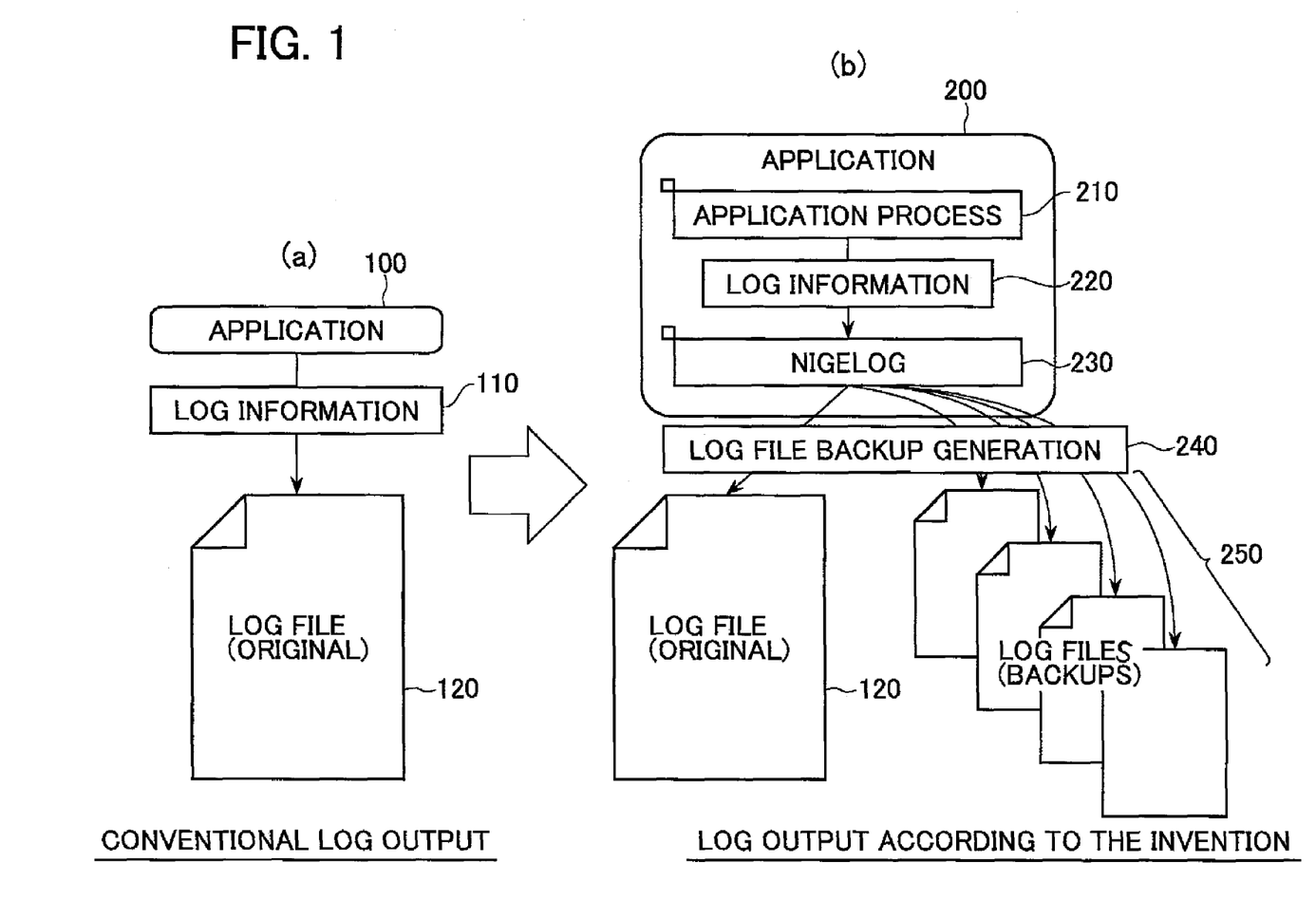
FIG. 1 is a block diagram illustrating generation of log files.

Referring to the drawings, FIG. 1 is a block diagram that compares conventional log output with output according to an embodiment of the present invention. FIG. 1(a) illustrates a conventional log output method, and includes an executable application 100, log information 110, and a log file 120. When the application 100 is executed, the log information 110 is generated, and appended to the log file 120.

FIG. 1(b) illustrates a log output method used in the present invention, and includes a conventional application process 210 within an executable application 200, output of the log information 220, and NIGELOG processing 230 according to the present invention (the term NIGELOG is a Japanese term meaning "dodge log" and implies a method of avoiding attacks on log files). By means of this NIGELOG processing 230, when the executable application 200 is launched, in addition to the original log file 120, a log file backup generation process 240 creates an arbitrary number of backup log files 250. Thereafter, the log information output by the system is stored in a substantially simultaneous manner in all of the log files, including the original log file and the backup log files. In other words, log information backups are generated in real time.

Figure 2:
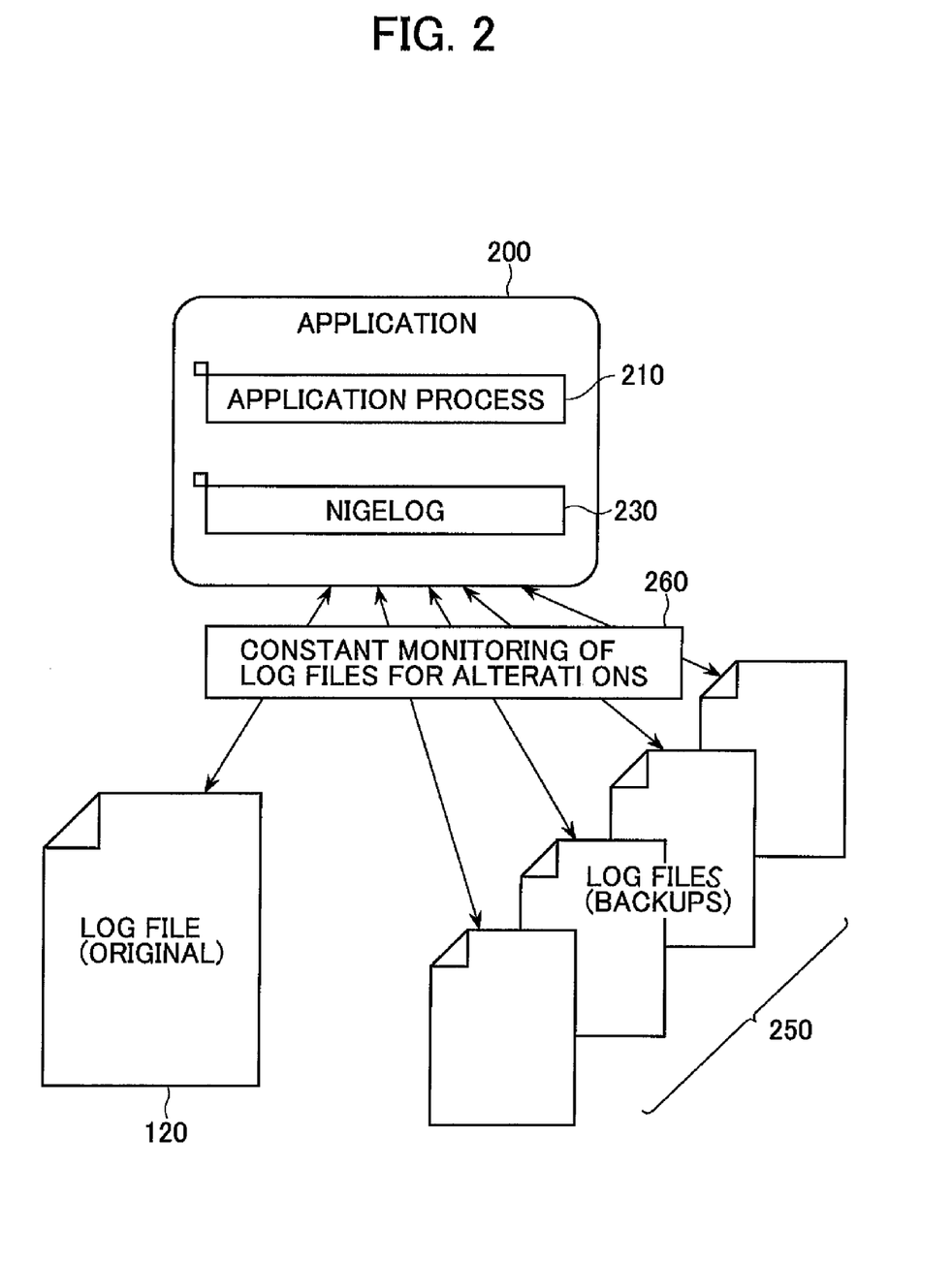
FIG. 2 is a block diagram illustrating log file alteration detection.

FIG. 2 illustrates detection of log file alteration. During execution of the application 200, the NIGELOG processing 230 is performed at the same time as the application process 210. In order to detect alterations to log information, a continual monitoring process 260 of the NIGELOG processing 230, periodically monitors all of the log files, including not only the original log file 120, but also the backup files 250, for alterations thereto.

Figure 3:
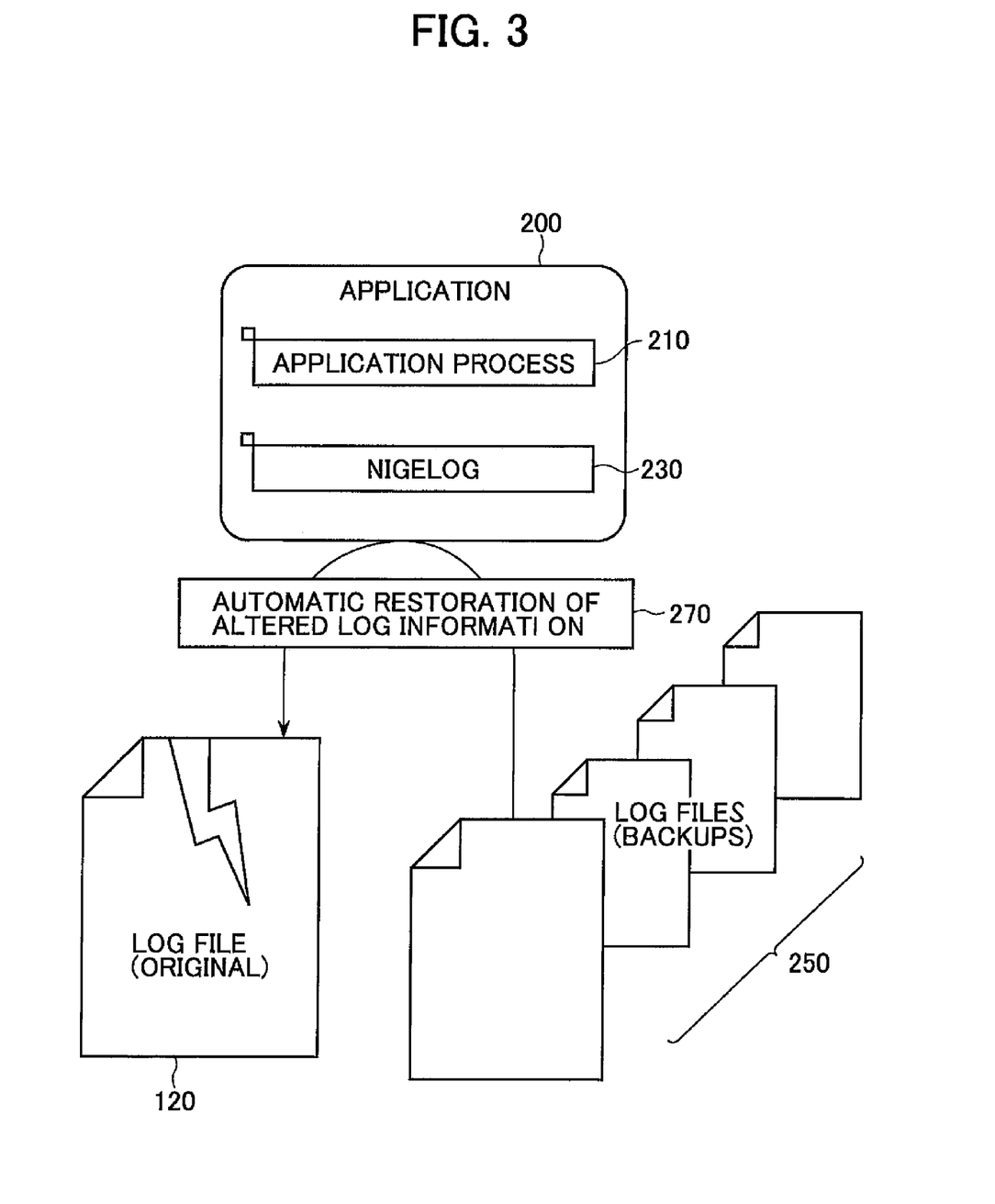
FIG. 3 is a block diagram illustrating automatic restoring of altered log information.

FIG. 3 illustrates automatic restoration of log information that has been altered. During execution of the application 200, the NIGELOG processing 230 is performed concurrently with the application process 210. If the NIGELOG processing 230 detects alterations to the original log file 120, it runs an automatic restoration process 270 to restore altered log information, and data is immediately restored from the backup log files 250.

Nevertheless, it is possible that if all of the log files, including the backup files, are altered or deleted, the traces of intrusion will be eliminated. In this regard, in the present invention, while the location of the original log file may be known, all of the backup log files are hidden within the file system. Consequently, the locations of the backup log files are unknown to intruders and, therefore, these intruders are unable to delete data evidence of their intrusion by altering the log information.

As monitoring for alterations to the log files is performed periodically, it is possible to identify in real time whether the log files have undergone alterations or deletion. Consequently, system administrators are given an opportunity to recognize and further examine illegal events.

BACKUP LOG FILE HIDING METHODS

As described above, in the present invention, backup log files can be hidden within the file system of a computer. If, however, all of the log files are eliminated at the same time, it will not be possible to restore the log information. Accordingly, it is necessary to hide the backup log files in a manner which makes them as difficult to find as possible.

In this regard, backup log files are hidden according to the following methods.

(1) Hiding in arbitrary directories
Log files are created in any write-enabled directories.
(2) Hiding under arbitrary file names
Any file name can be used for backup log files.

(3) Creation of an arbitrary number of backup log files
Any number of log files may be created.
(4) Periodic re-hiding of hidden log files
Hidden log files are not located in particular directories in a semi-permanent manner, but rather are periodically moved within the file system.

As shown in TABLE 1, server computers running operating systems such as UNIX contain over 1000 directories immediately after installation of the operating system.

TABLE 1

| Number of directories | Operating Environment |
| --- | --- |
| approximately 1600 | RedHat Linux release 5.2, standard installation, no changes by user |
| approximately 8000 | Sun Solaris 2.6, file server used by 20 users |

Furthermore, this technique allows for automatic execution of processes for more secure protection of the log information, such as notifying a system administrator, if even one attempt is made to alter log information. As a result of these features, the present invention allows for the protection of log information in a manner that is both sufficient for practical applications and simple.

DETECTION OF LOG INFORMATION ALTERATION

In order to detect alteration of log information a stat structure is used to maintain file attribute data. However, as it is relatively easy to alter this data, with this alone, it is possible that log information could be altered without NIGELOG detecting the alteration (Gene H. Kim, Eugene H. Spafford: Design and Implementation of a Tripwire: A File System Integrity Checker Purdue Technical Report CSD-TR-93-071, Purdue University, 1993).

Accordingly, in the present invention an extended stat structure 236 is created where "fingerprint data" that was generated based on the content of the log file is added, and this structure is used for alteration detection data. In the present specification, "fingerprint data" refers to data generated with a one-way hash function, taking the entire contents of the log file as its input. Current implementations use MD5 Message Digest (R. L. Rivest: RFC1321: The MD5 Message Digest Algorithm. MIT Laboratory for Computer Science and RSA Data Security, Inc., 1992). Consequently, even if time data is altered and the stat structure data is completely unchanged, it is still possible to detect alterations to log information.

In the following, an example of implementation is described, wherein the processing described above is implemented on UNIX as a C++ class using pthreads (Bradford Nichols, Dick Buttlar and Jaqueline Proulx Farrel: Pthread Programming A POSIX Standard for Better Multiprocessing, O'Reilly, 1996). The library known as pthread is a portable, platform-independent library for running multiple processes in parallel. This library is standardized to meet the POSIX UNIX system interface standard for applications complying with the IEEE 1003.1 standard.

Figure 4:
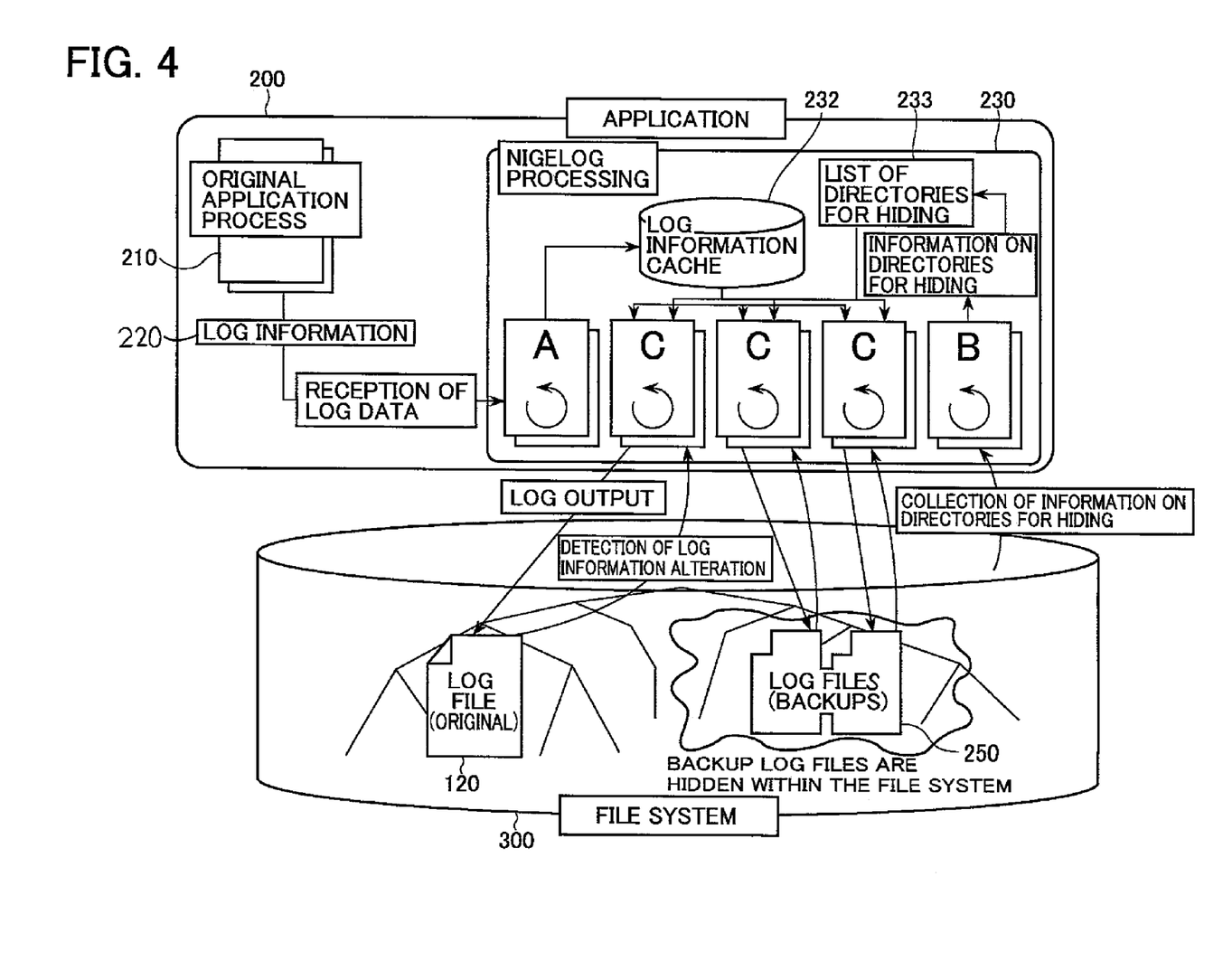
FIG. 4 is a block diagram illustrating NIGELOG processing.

FIG. 4 illustrates the implemented NIGELOG processing. The application 200 performs both the original application process 210 and NIGELOG processing 230. The NIGELOG processing 230 involves a log information cache 232, a list of possible hiding directories 233 in which log files can be hidden, the original log file 120, and the backup log files 250, for carrying out this NIGELOG processing 230. All of these log files are stored within a file system 300 on a server computer. The NIGELOG processing uses these to carry out the individual NIGELOG functions described above in parallel. Processing executed by a plurality of threads comprises the following three types (A, B and C threads in FIG. 4). In the following, implementation of the NIGELOG processing functions will be described with reference to this figure.

A Threads—Log Information Reception Process

This process receives the log information 220 output by the original application process 210 and stores it in the internal cache 232 in NIGELOG processing 230.

B Threads—Hiding Directory Information Collection Process

This process scans file system 300, and collects directory information on directories in which hiding is possible. The collected data comprises a directory list 233 of directories in which NIGELOG hiding is possible, which is stored as a variable in NIGELOG processing 230, and is used for all log file generation and movement in NIGELOG processing.

C Threads—Alteration Detection/Log Information Writing Process

For each log file, one thread is generated and performs processing. This processing includes log file alteration detection, automatic restoration when alteration is detected, and periodic re-hiding.

Figure 5:
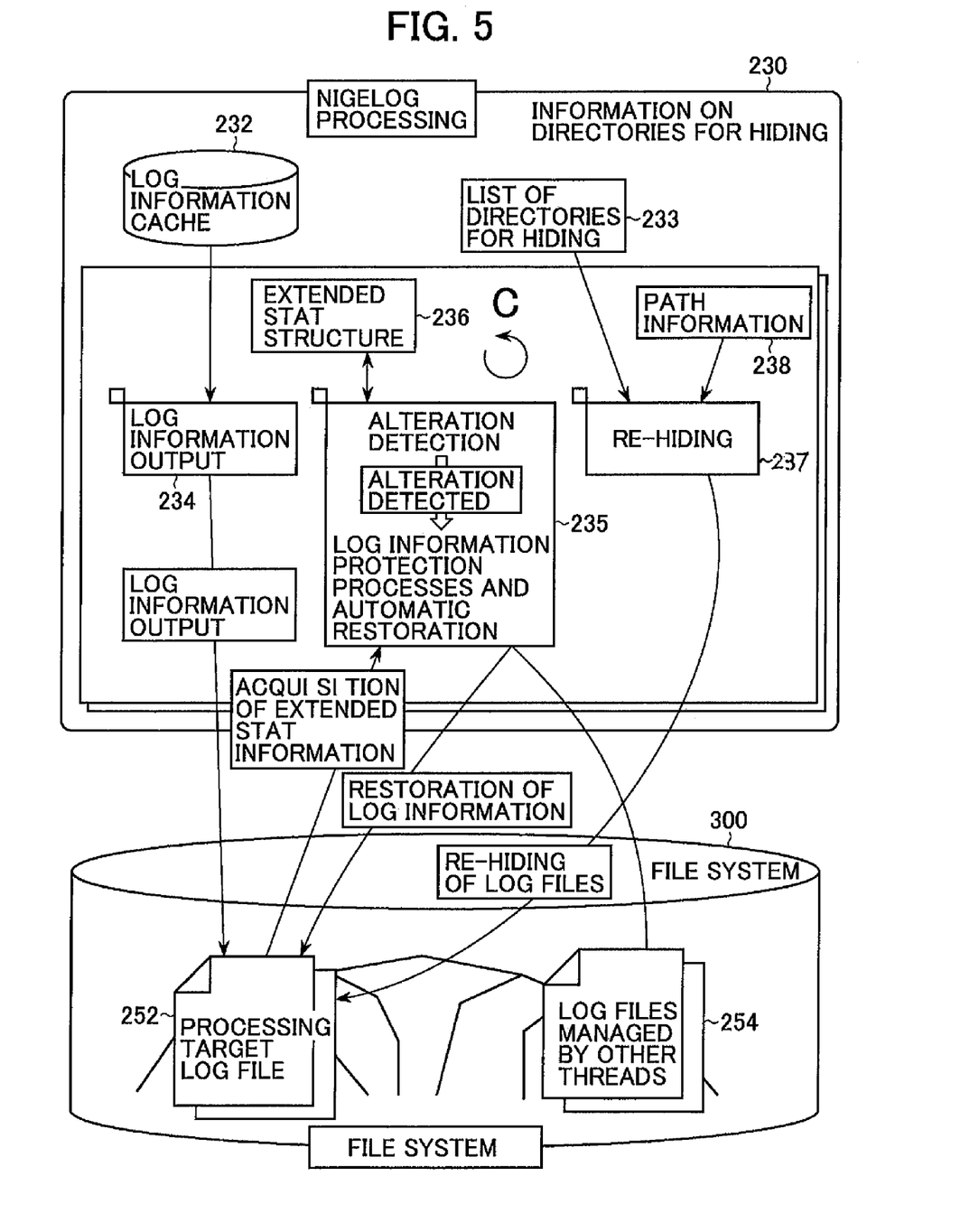
FIG. 5 is a block diagram illustrating in detail the processing of log files.

FIG. 5 illustrates processing for log files and is a detailed illustration of the input/output for any one of a plurality of threads C shown in FIG. 4. The thread C comprises 3 principal processes: a log information output process 234; a log information alteration detection process/process upon detection 235; and a log file re-hiding process 237. Further, an extended stat structure 236, used for detection of altered information, and path information 238, used for re-hiding hidden log files, are provided. This thread manages a log file 252, which is its processing target log file, and when this processing target log file 252 is altered, etc., log information is restored using log files 254 which are managed by other threads. Further explanation is provided below, with reference to FIG. 5.

(1) Log Information Output Processing The log information stored in the internal cache 232 by the log information reception process in the NIGELOG processing 230, is instantly recorded in the processing target log files 252 of each thread by means of the log information output process 234 in each thread. Furthermore, the log information in internal cache 232 is deleted when all of the log files have been recorded.

(2) Log Information Alteration Detection

In this process, using the extended stat structure 236, the extended stat structure data is acquired periodically from the processing target log files 252, and the alteration detection process 235 compares this with the extended stat structure data produced the previous time that the process was performed. Thus, alterations to processing target log files 252 are detected. Even in a worst case scenario, this processing allows for detection of alterations following an alteration monitoring interval.

It is also possible to automatically perform additional processing based on this alteration detection.

(3) Automatic Restoration of Altered Log Information

Automatic restoration of altered log information is a process which is executed when the alteration detection process 235 detects an alteration. This process deletes the altered processing target log file 252, and automatically restores the log information from an unaltered log file 254 administered by another thread. This type of processing is also performed by the other threads.

The processing for backup log files 250 differs for that for original log file 120 in that these backup log files are hidden and periodically re-hidden, whereas the original log file is not.

(4) Re-hiding of Log Files

The re-hiding process 237 periodically re-hides the back up log files 250, which have been hidden by each thread, in directories different from the ones in which they are currently hidden, regardless of alteration detection. This process is not limited to changing the hiding directories, but also changes the file names of the log files 250. Furthermore, when an alteration to the processing target log file 252 of any thread is detected, execution of re-hiding process 237 is forced for the backup log files 250 of each thread.

The present invention can be applied, for example, to a syslog that records information necessary for administration of system operations, such as run states, under UNIX. The processing of the present invention protects log information output by the syslog. The log information output as the result of various commands can be logged, using the syslog, and this information can be protected.

It is a matter of course that this processing functions on computers other than server computers. However, for reasons such as the load placed on the computer, and the fact that the security of the log information is dependant on the number of directories within the file system in which hiding is possible, it is particularly suitable for server computers, which are generally considered to have abundant CPU and file system resources.

ADVANTAGES OF THE INVENTION

The invention presents the following advantages.

Alterations to Log Information Can be Detected

In the system according to the present invention, the alteration detection process that monitors the log files makes it possible to detect alteration of log information. Consequently, in a matter of seconds, the system administrator can be made aware of any wrongdoing concerning log flies, and can respond quickly to this wrongdoing. Also, when such events occur, any number of predetermined processes can be automatically performed in order to protect the log information. One such example is printing out all the current log information on paper in response to a detected alteration.

Altered Log Information Can be Restored

This system backs up log information in real time. Consequently, if log information is altered, it is possible to restore the log information to the state in which it was before the alteration took place. Consequently, if an intruder deletes the log file itself, the log information existent prior to deletion can be restored.

Additional Hardware is not Required

This technique does not require such additional hardware as secure computers or write-once media. Consequently, it is not necessary to consider communication security issues, the trouble of maintaining media is spared, and human error in this maintenance can be avoided.

Can be Incorporated in Any Application

This system is implemented as a C++ class. Accordingly, it can easily be incorporated in various applications written in C and C++. In the current implementation, there are only two interface functions for the application which outputs log information: an initialization function, and a log information output function. Furthermore, the processing in this technique is not dependent on the content of the log information. Accordingly, additional functions such as encryption or compression of the log information can easily be implemented either through the application itself, or by creating a class which inherits this class.

Can be Run on Many UNIX Platforms

While the operations of the embodiment described above have not been verified on all UNIX operating systems, it is possible to run this system on various UNIX operating systems. Operating conditions for the current implementation are use of C++ processing and the standard template library (STL) (D. R. Musser, Atul Saini, Alexander Stepanov: STL Tutorial and Reference Guide—C++ programming with the standard template library, Addison-Wesley Publishing, 1996), and compatibility with the pthread library. The pthread library complies with the POSIX standard. Furthermore, as STL is in the process of becoming a standard C++ class library, it can be used on computers running many UNIX operating systems.

As a result of the advantages described above, it is relatively easy to prevent alteration or deletion of log information using this technique. One necessary condition for log information, in terms of intruder detection, is that it be impossible to alter the log information existent prior to the intruder gaining rights (Bruce Schneier, John Kelsey: Cryptographic Support for Secure Logs on Untrusted Machines, The Seventh UNSENIX Security Symposium Proceedings, UNSENIX Press, pp. 53-62, 1998). This is because only by meeting these conditions is it possible for intrusion detection operations to detect intrusion by monitoring and analyzing log information. The present technique allows these conditions to be met by making alteration difficult and by allowing for restoration even in the event that, for example, the log data is deleted.

Comparison with Prior Log Information Protection Systems

The technique of the present invention is hereinafter compared with related research and conventional methods in terms of log protection techniques.

Encryption-Based Techniques

Several systems exist which protect log information by means of encryption (Bruce Schneier, John Kelsey: Cryptographic Support for Secure Logs on Untrusted Machines, The Seventh USENIX Security Symposium Proceedings, USENIX Press pp. 53-62, 1998, Core SDI S. A.: secure syslog, http://www.core-sdi.com/Core-SDI/english/slogging/ssyslog.html). However, these systems only make it difficult to alter log information and are unable to protect against indiscriminate alteration and log information deletion. It is sometimes held that detecting intrusion by means of detecting the alteration or deletion of log files is sufficient. This is by no means desirable, as it entails losing the information required to examine the conditions that made the intrusion successful and the extent of the damage arising as a result, as well as to identify the perpetrator.

Storage on Write-Once Media

Log information protection techniques that use write-once data are the most secure because once the information has been written to the media it cannot be altered or deleted. There are, however, problems with this technique. One of these is the issue of knowing when to save the log information to the media. Two possible methods are: one in which log data output over a predetermined period of time is periodically saved in single operation; and another in which log information is saved each time it is output.

With the first of these two methods, it is clear that, as log information is saved regardless of any alterations thereto, altered log information may be recorded and thus the integrity of the log information cannot be protected. With the second of these two methods, on the other hand, while it is possible to fully protect log information, this function only provides protection, and separate methods must be introduced for detection of alterations. Further, both methods require maintenance of the media, which is troublesome and may be subject to human error.

While events wherein alteration of log information is detected can be used effectively to trigger saving of the log information to write-once media, with normal log information, even if alteration is detected by some method, log information will already be lost at this point. Accordingly, even if this is saved on write-once media, the integrity of the log information cannot be protected. Use of the present invention, however, allows alterations to be detected and for the lost log information to be restored after detection. Accordingly, effective use can be made of write-once media.

Transfer of Log Information to Trusted Computers

In this technique, by transferring generated log information to a trusted computer, log information is protected. With this technique, however, the security of communications between the computer that generates the log and the computer that protects the log must also be assured.

One method of assuring this security is by encrypting the log information that is transferred. However, in the event of attacks, such as denial-of-service attacks that render communication impossible, there is a risk of log information suddenly being lost.

As described above, by virtue of the present invention, log information is protected, and it is difficult for intruders to erase their own tracks by altering or deleting log information. Accordingly, by periodically examining or analyzing log information, intrusions may be detected with greater reliability.

While preferred embodiments of the present invention have been set forth in detail above, those skilled in the art who have reviewed the present disclosure will readily appreciate that other embodiments can be realized within the scope of the invention. Therefore, the present invention should be construed as being limited only by the appended claims.

What is claimed is:

1. A log file protection system for protecting log files in which computer system operations have been recorded, comprising:

log file creation means which create a plurality of identical log files which record the operations of said computer system;

alteration detection means which periodically monitor said plurality of identical log files for alteration or deletion; and restoration means which restore an altered or deleted log file by replacing the altered or deleted log file with an unaltered log file from the plurality of identical log files when the altered or deleted log file is detected by said alteration detection means.

2. The log file protection system of claim 1, wherein said log file creation means create said plurality of identical log files in parallel, using identical information.

3. The log file protection system of claim 1, further comprising hiding means which hide all but one of the plurality of identical log files.

4. The log file protection system of claim 3, wherein said hiding means periodically re-hide said hidden log files in different locations.

5. The log file protection system of claim 3, wherein said hiding means re-hide said hidden log files in different locations, when alteration or deletion is detected by said alteration detection means.

6. The log file protection system of claim 5, further comprising means which perform additional processing, when alteration or deletion is detected by said alteration detection means.

7. The log file protection system of claim 1, further comprising means which perform additional processing, when alteration or deletion is detected by said alteration detection means.

8. The log file protection system of claim 2, further comprising means which perform additional processing, when alteration or deletion is detected by said alteration detection means.

9. The log file protection system of claim 2, further comprising hiding means which hide all but one of the plurality of identical log files.

10. The log file protection system of claim 9, further comprising means which perform additional processing, when alteration or deletion is detected by said alteration detection means.

11. The log file protection system of claim 9, wherein said hiding means re-hide said hidden log files in different locations, when alteration or deletion is detected by said alteration detection means.

12. The log file protection system of claim 11, further comprising means which perform additional processing, when alteration or deletion is detected by said alteration detection means.

13. The log file protection system of claim 9, wherein said hiding means periodically re-hide said hidden log files in different locations.

14. The log file protection system of claim 13, further comprising means which perform additional processing, when alteration or deletion is detected by said alteration detection means.

15. The log file protection system of claim 13, wherein said hiding means re-hide said hidden log files in different locations, when alteration or deletion is detected by said alteration detection means.

16. The log file protection system of claim 15, further comprising means which perform additional processing, when alteration or deletion is detected by said alteration detection means.

17. The log file protection system of claim 3, further comprising means which perform additional processing, when alteration or deletion is detected by said alteration detection means.

18. The log file protection system of claim 4, further comprising means which perform additional processing, when alteration or deletion is detected by said alteration detection means.

19. The log file protection system of claim 4, wherein said hiding means re-hide said hidden log files in different locations, when alteration or deletion is detected by said alteration detection means.

20. The log file protection system of claim 19, further comprising means which perform additional processing, when alteration or deletion is detected by said alteration detection means.

21. The log file protection system of claim 1, wherein said alteration detection means monitor said log files by using fingerprint data generated based on the entire content of the log file.

22. The log file protection system of claim 1, wherein said restoration means restore the altered or deleted log file automatically.

23. Recording media which stores a program for implementing the log file protection system according to any of claims 1-6, 8-20 or 21-22 on a computer system.

24. A log file protection method for protecting log files in which computer system operations have been recorded, comprising:
  (a) creating a plurality of identical log files which record the operations of said computer system;
  (b) periodically monitoring said plurality of identical log files for alteration or deletion; and
  (c) restoring an altered or deleted log file by replacing the altered or deleted log file with an unaltered log file from the plurality of identical log files when the altered or deleted log file is detected in said periodic monitoring step.

* * * * *